Dec. 20, 1932.  G. B. PICKOP  1,891,358
LOCK NUT
Filed Jan. 8, 1932
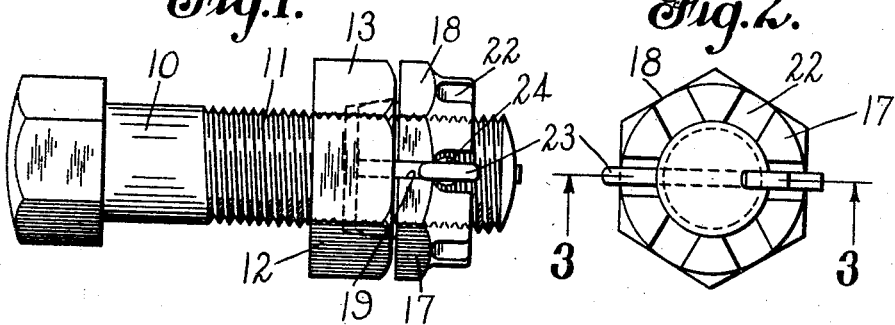
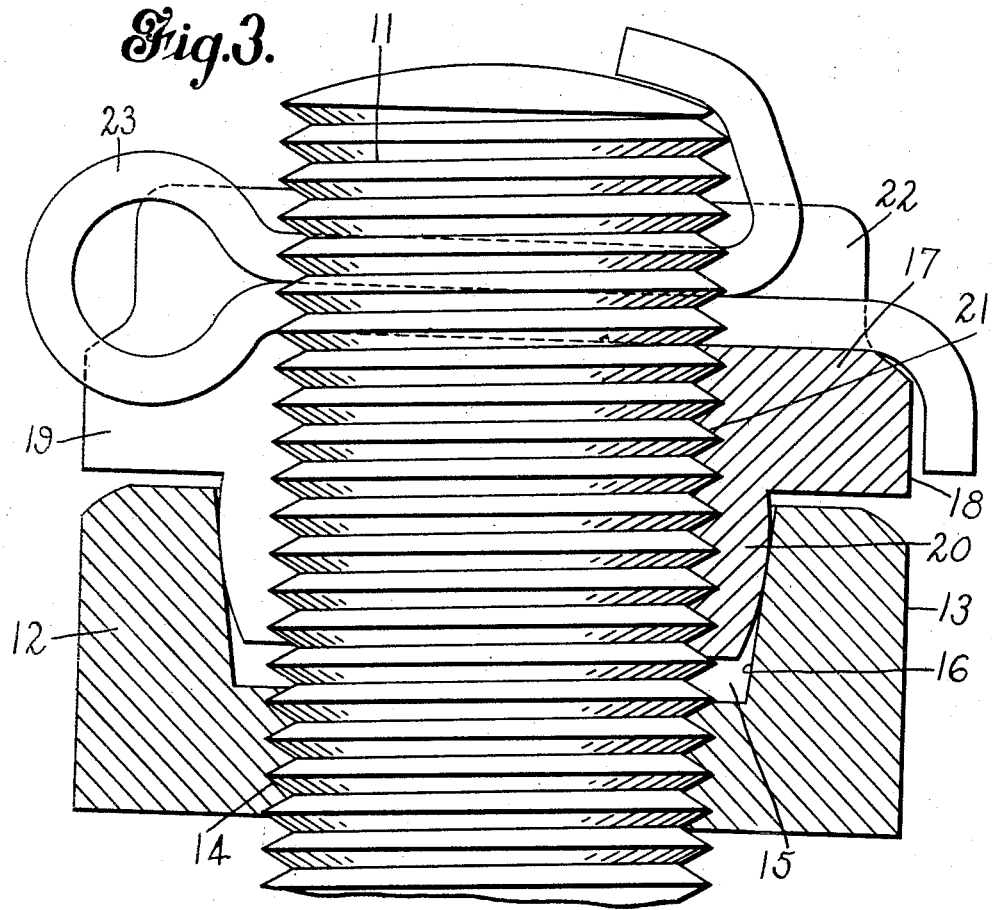
Inventor
George B. Pickop
By Rockwell & Bartholow
Attorneys Patented Dec. 20, 1932

1,891,358

UNITED STATES PATENT OFFICE

GEORGE B. PICKOP, OF NEW HAVEN, CONNECTICUT

LOCK NUT

Application filed January 8, 1932. Serial No. 585,420.

This invention relates to lock nuts and more particularly to a device whereby a nut threaded upon a bolt in the usual manner may be securely locked in position so that any possibility of the nut backing off of the bolt threads accidentally will be absolutely prohibited.

In the past it has been attempted to secure nuts upon bolts in various ways. In some instances it has been proposed to provide the regular nut with a recess in its upper face and to provide an additional or lock nut with a tapered projection to enter this recess and bind therein when the lock nut is threaded upon the bolt above the regular nut. With such construction, however, it sometimes occurs that due to vibration both nuts will back off of the bolt threads together and result in the parts becoming loose.

It is also common to secure a nut in position by providing the nut with castellations and inserting a cotter pin through an opening in the bolt, the pin lying in the castellations of the nut. Such a practice has its disadvantages, one of which is that the castellations in the nut must be spaced apart and as a result it sometimes occurs that the nut, after being tightened, must be backed off a fraction of a turn in order to insert the cotter pin. As a result, the nut is not tightened as securely as is possible, and under vibration the threads become worn and often the cotter pin breaks.

One object of my invention is to provide a lock nut construction wherein the usual nut may be drawn up tightly upon the bolt, and may be secured in this position against any possibility of loosening.

Another object of the invention is the provision of a lock nut designed to be threaded upon the bolt above the regular nut and provided with means to clamp or bind the regular nut in place, and also provided with means whereby the lock nut will be prevented from turning upon or backing off from the threads of the bolt.

Still another object of the invention is the provision upon the locking nut of a tapered portion fitting in a recess in the upper face of the regular nut, the tapered portion being so formed that it may be forced into the recess in the regular nut with a minimum amount of effort.

To these and other ends, the invention consists in the novel features and combinations of parts to be hereinafter described and claimed.

In the drawing:

Fig. 1 is a side elevational view of a bolt and nut construction embodying my invention;

Fig. 2 is a top plan view of the same, and

Fig. 3 is an enlarged sectional view on line 3—3 of Fig. 2 showing the lock nut construction.

In Fig. 1 of the drawing I have shown a bolt 10 which may be of any usual construction, the bolt being provided with the usual threaded end 11. Upon the threads of the bolt is received a nut 12 which is provided with the usual wrench faces 13 and a threaded bore 14 to cooperate with the threads 11 of the bolt. In the upper surface of this nut is provided a recess 15 which is adjacent to and surrounds the bolt, the recess being bounded by a tapered or sloping wall 16, so that the recess is greater in diameter at its mouth than at the base.

The lock nut 17 is also provided with wrench faces 18 and is split axially as shown at 19 so that it may be compressed to some extent, as will be referred to hereinafter. Upon the lower face of the lock nut is provided a projection or boss 20, which is designed to enter the recess 15, the body of the nut and also the tapered portion being provided with a threaded bore 21 to cooperate with the threads 11 of the bolt. It will, of course, be understood that the boss 20 is split as is the body portion of the lock nut 17.

The upper surface of the lock nut 17 is provided with castellations 22 for the reception of a cotter pin. It will be understood that any number of the recesses or grooves forming these castellations may be provided, there being six of such grooves in the embodiment shown. As shown, one of these grooves coincides with the split 19 in the nut, although such an arrangement is optional.

It will be noted that, while the wall 16 of the recess is provided with the usual gradual taper or may be said to be frusto-conical in shape, the surface of the boss 20 which engages this wall, while being tapered or reduced in size at its lower end, is not truly conical or frusto-conical, but is barrel shaped in its outline. The result of this arrangement is that while the boss is provided with a relatively small lower end which will enter the recess, the diameter of the boss increases toward the body of the bolt, and the surface of the boss will thus be caused to engaged the wall of the recess so that the lock nut, due to its split form, will be contracted upon the bolt and will also bind tightly against the wall of the recess of the nut 12 and hold it firmly in position. The contact of the surface of the boss 20 with the wall 16 of the nut 12 will, however, more closely approximate a line contact than a surface contact so that the friction between these parts will be materially lessened and as a result less resistance will be offered to screwing the lock nut down tightly. The effect, however, will be to lock the parts in position with firmness, and while the particular surface form of the boss 20 will result in a lessened resistance to the firm locking of the parts, the effectiveness of the arrangement will not be sacrificed.

When the nut 12 and the lock nut 17 have been screwed firmly upon the bolt, the cotter pin 23 may be inserted through the opening 24 of the bolt, the ends of the pin being received in the grooves 22 so that the lock nut 17 will be absolutely prevented from backing off. With the construction shown it will be possible in most cases to draw the lock nut up to a position in which the cotter pin may be inserted notwithstanding the fact that the parts may bind slightly before such a position is reached. If, however, this cannot be done and any slight backing off of the lock nut is required, such slight backing off will not materially affect the binding of the boss of the lock nut in the recess of the nut 12 due to the tapered shape of the boss and the wall of the recess.

It will be apparent, however, that I have provided a very secure and firm construction wherein the lower nut may be locked in any desired position upon the bolt, and will be secured firmly in position with no possibility of being allowed to back off of the threads of the bolt.

While I have shown and described a preferred embodiment of my invention, it will be understood that it is not to be limited to all of the details shown, but is capable of modification and variation within the spirit of the invention and within the scope of the appended claims.

What I claim is:

1. A bolt and nut construction comprising a threaded bolt having a transverse opening through the threaded portion spaced from the end thereof, a nut having a threaded opening to receive the bolt, a recess opening through the upper face of the nut and surrounding the bolt opening, a lock nut designed to be screwed upon the bolt above the first-named nut, said lock nut having wrench faces upon the body portion thereof, a tapered boss projecting from its lower surface, the body portion and boss of said nut being split whereby the nut may be contracted upon the bolt and being provided with a threaded opening to receive the bolt, said boss being designed to enter the recess in the first-named nut and to be contracted by pressure against the wall thereof, the wall of said recess being substantially frusto-conical in shape and the surface of the boss being barrel-shaped to lessen the surface contact and consequent friction between the parts, and the upper surface of said lock nut being provided with grooves to receive a member passing through the transverse opening in the bolt to hold the nut against rotation thereon.

2. A bolt and nut construction comprising a threaded bolt having a transverse opening through the threaded portion and spaced from the end thereof, a nut having a threaded opening therein to receive the bolt, a recess opening through the upper face of the nut and surrounding the bolt opening, a lock nut having wrench faces upon the body portion thereof and a tapered boss projecting from its lower surface, the body portion and the boss being provided with a threaded opening to receive the bolt, and the body and boss of said nut being split whereby the nut may be contracted upon the bolt when the nut is screwed thereon so that the boss enters the recess in the first-named nut, the upper surface of said last-named nut being provided with grooves to receive a member passing through the transverse opening in the bolt to hold the nut against rotation thereon, said tapered boss being provided with a barrel-shaped outer surface to lessen the surface contact with the first-named nut.

In witness whereof, I have hereunto set my hand this 6th day of January, 1932.

GEORGE B. PICKOP.